United States Patent [19]

Wilhelm, III

[11] Patent Number: 4,733,880
[45] Date of Patent: Mar. 29, 1988

[54] RIDABLE ARM EXERCISE BICYCLE

[76] Inventor: Donald Wilhelm, III, 864 Beechwood Dr., Colma, Calif. 94015

[21] Appl. No.: 26,935

[22] Filed: Mar. 17, 1987

[51] Int. Cl.$^4$ .............................................. B62M 1/00
[52] U.S. Cl. .................................... 280/234; 280/233; 280/240; 280/244; 272/73
[58] Field of Search .............. 280/234, 240, 232, 233, 280/224, 242 R, 244, 261; 272/73

[56] References Cited

U.S. PATENT DOCUMENTS

| | | | |
|---|---|---|---|
| 635,590 | 10/1899 | Quinn | 280/234 |
| 2,884,259 | 4/1959 | Snodgrass | 280/234 |
| 4,437,677 | 3/1984 | Ksayian | |

OTHER PUBLICATIONS

Schwinn Fitness Equipment brochure/Part No. 74-142 Excelsior Fitness Equipment Co., 615 Landwehr Rd., Northbrook, IL 60062.

Primary Examiner—John J. Love
Assistant Examiner—Donn McGiehan
Attorney, Agent, or Firm—Townsend and Townsend

[57] ABSTRACT

A bicycle having conventional foot pedals with driving rotating cranks connected to a load is improved with arm pedals. Preferably, each foot pedal forms the point of attachment of a line under tension. The line from each pedal passes upwardly from the pedal to a seat sheave in the vicinity of the seat. Thereafter, the line from the pedal goes forwardly to a forward sheave mounted on the front of the bicycle frame. From the forward sheave the line runs rearward to a second seat sheave and dead ends at a point of attachment on the opposite pedal. Hand pedals are connected to the line from each pedal in that portion of the line between the seat sheave and the forward sheave. Operation of the hand pedals is synchronized with the traditional foot cycling motion of the foot pedals. Upward stroke of the foot pedals is assisted with tension in the connected running rigging from both hand pedals. A preferred hand pedal includes a lever having a pivotal mount at the bottom end to the bicycle frame with the hand pedals at the upper end. The running rigging is attached to the levers between the handles and the pivot.

5 Claims, 5 Drawing Figures

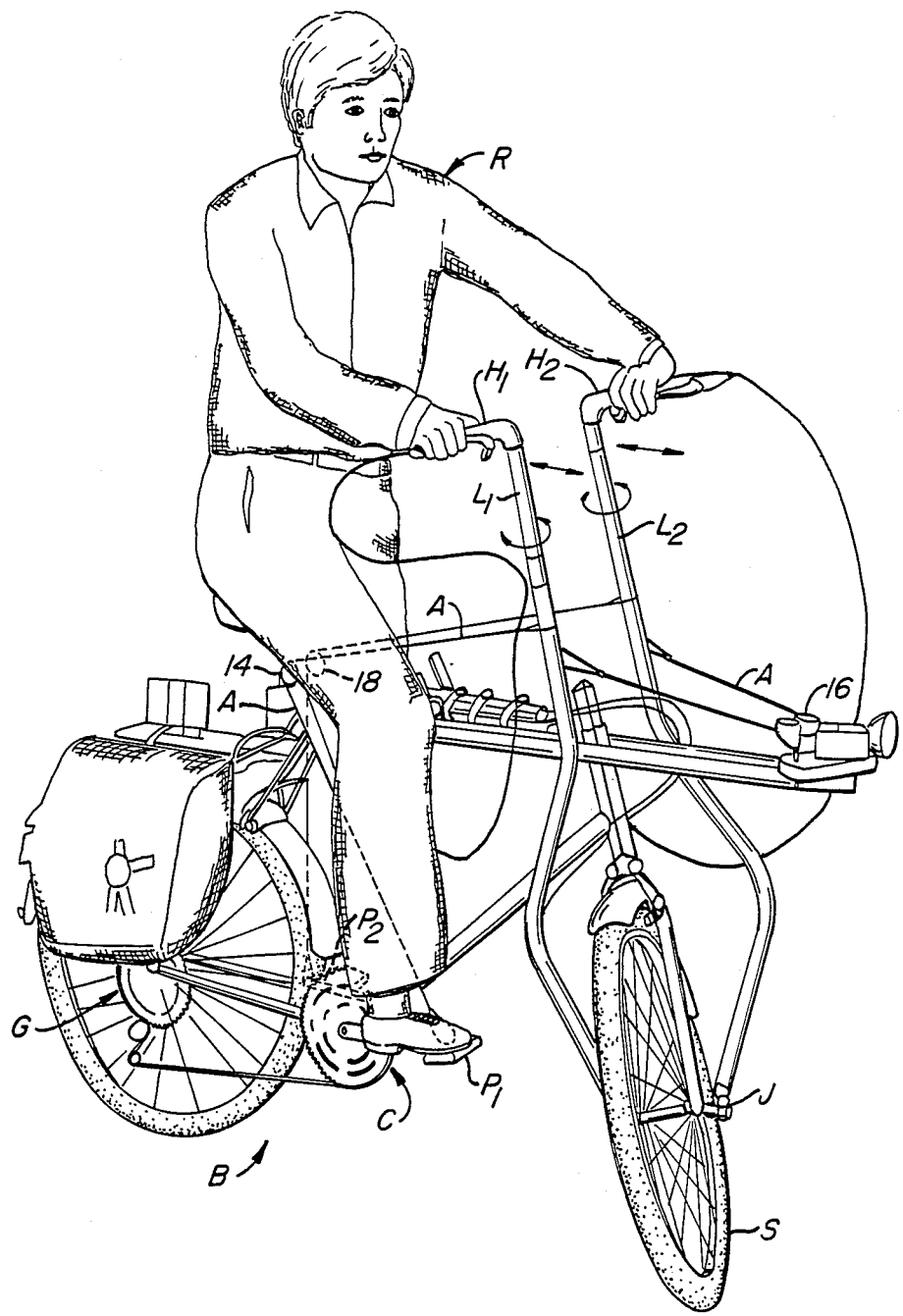
FIG._1.

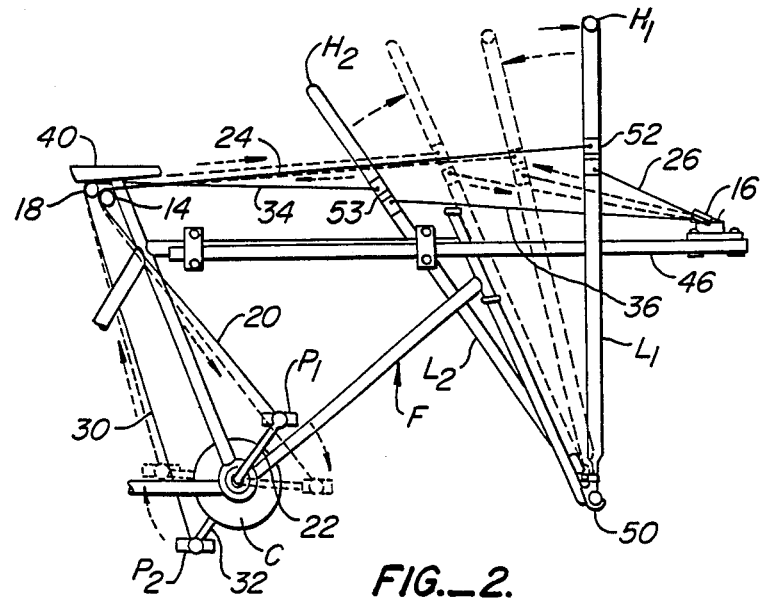
FIG._2.
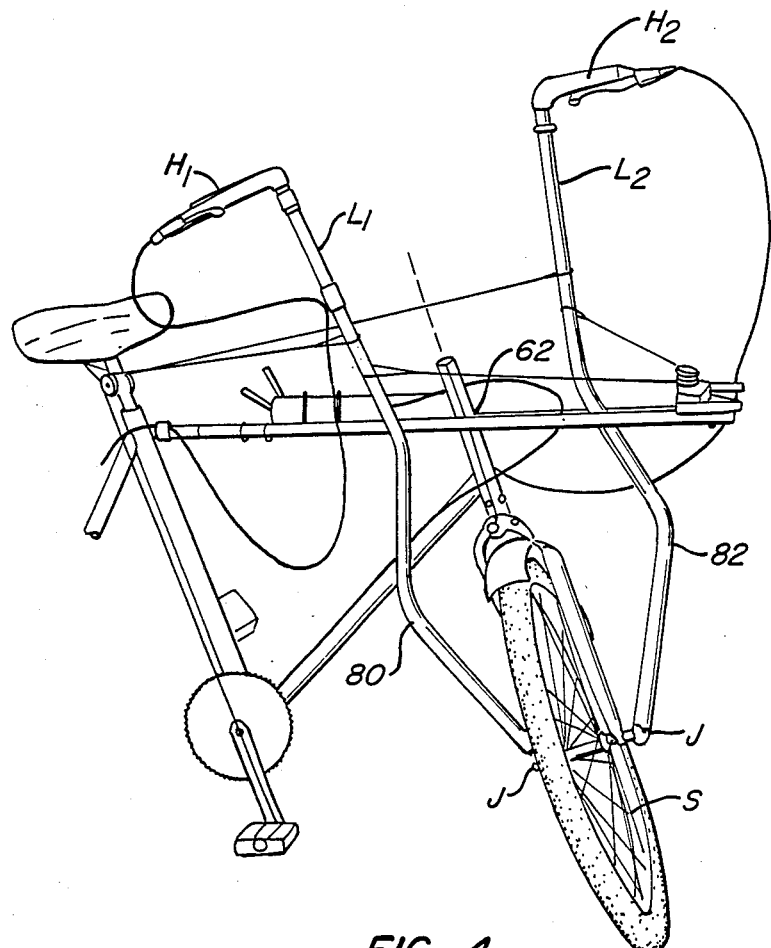
FIG._4.

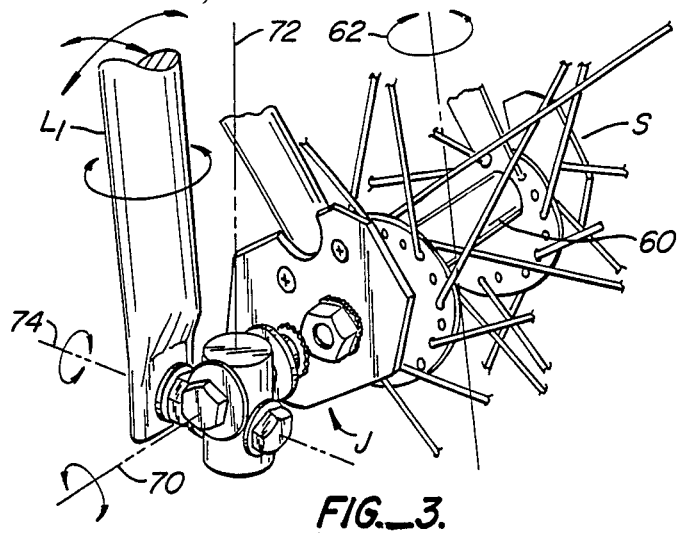
FIG._3.
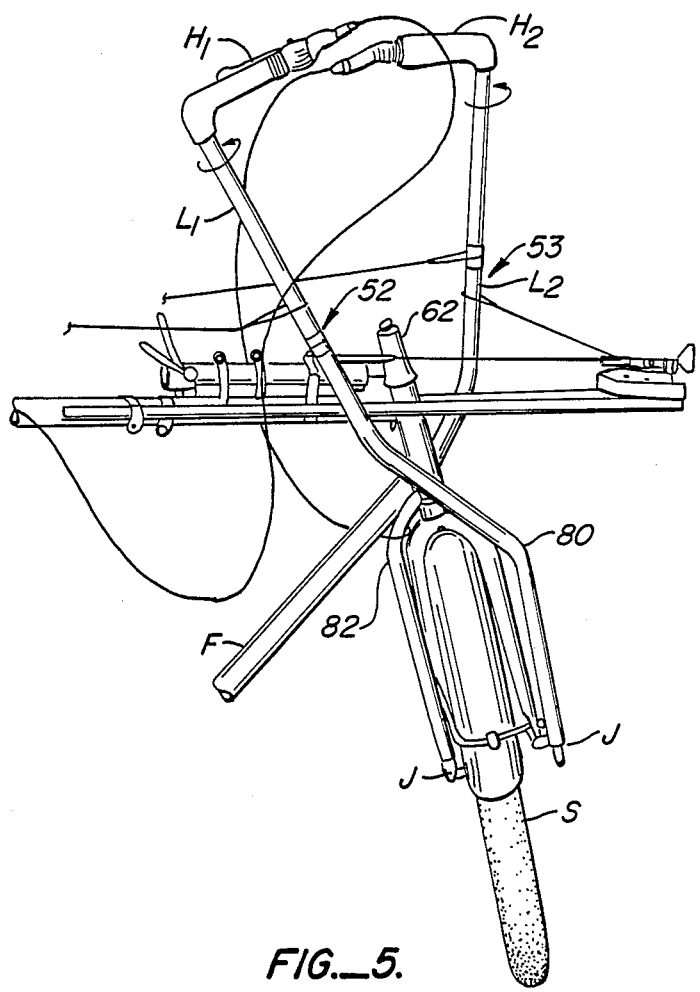
FIG._5.

RIDABLE ARM EXERCISE BICYCLE

BACKGROUND OF THE INVENTION

This invention relates to bicycles. Specifically, this invention discloses a bicycle with hand pedals that can be ridden.

SUMMARY OF THE PRIOR ART

Bicycle and exercise bicycles having hand pedals are known. For instance see Ksayian U.S. Pat. No. 4,437,677.

In the Ksayian device, rocker arms are employed having foot pedals at one end and the handle at the other end. The conventional drive mechanism of a cycle is of necessity drastically modified relying in part on ratchet mechanisms.

Bicycle exercise machines having hand pedals are known. For example one such machine is sold under the registered trademark SCHWINN AIR-DYNE by the Schwinn Corporation of Northbrook, Ill. This latter apparatus requires solid links between the chain sprocket and actuated levers together with eccentrically mounted foot pedal cranks. It constitutes a radical departure from the traditional chain sprocket foot crank and pedal drive of cycles.

STATEMENT OF THE PROBLEM

There remains a need for a hand pedal and foot pedal cycle for both stationary exercise and riding which constitutes a small departure from conventional cycle drive.

SUMMARY OF THE INVENTION

A bicycle having conventional foot pedals with driving rotating cranks connected to a load is improved with arm pedals. Preferably, each foot pedal forms the point of attachment of a line under tension. The line from each pedal passes upwardly from the pedal to a seat sheave in the vicinity of the seat. Thereafter, the line from the pedal goes forwardly to a forward sheave mounted on the front of the bicycle frame. From the forward sheave the line runs rearward to a second seat sheave and dead ends at a point of attachment on the opposite pedal. The line and sheaves between the pedals thus forms continuous running rigging. Hand pedals are connected to the line from each pedal in that portion of the line between the seat sheave and the forward sheave. Operation of the hand pedals is synchronized with the traditional foot cycling motion of the foot pedals. Downward stroke of the foot pedals is conventional. Upward stroke of the foot pedals is unconventional with tension in the connected running rigging from both hand pedals (one moving forwardly, the other moving rearwards) operating to pull the rising pedal upwardly. A preferred hand pedal includes a lever having a pivotal mount at the bottom end to the bicycle frame with the hand pedals at the upper end. The running rigging is attached to the levers between the handles and the pivot. The bicycle drive is useful in both a stationary exercise mode or on a propelled two wheel bicycle. In this latter case, the levers are pivoted at a Cardan joint on the bicycle front wheel to permit steering. The Cardan joint lacks freedom of motion along the steering axis of the front wheel so that turning of the reciprocating handles cause turning of the steering wheel. Levers with bend are disclosed to permit clearance of the steering wheel when turned.

OTHER OBJECTS AND ADVANTAGES

An object of this invention is to disclose a running rigging connection between a hand pedal and a cycle foot pedal to apply power on the upward stroke of a cycle foot pedal. According to this aspect of the invention, the foot pedal constitutes a point of attachment of a line under tension. A line which is part of the running rigging extends upwardly to the vicinity of the bicycle seat where it passes over a sheave. The line passing over the sheave extends forwardly of the bicycle frame. At its other end it is attached to a hand pedal. In operation when the hand pedal is pushed away from a rider, an upward force is imparted to a cycle foot pedal. Thus. the rider through his foot applies a conventional downward force (top dead center to bottom dead center) on one foot pedal while the line applies an unconventional upward force (bottom dead center to top dead center) on the opposite foot pedal.

A further object to this invention is to disclose continuous running rigging from one cycle foot pedal to the opposite cycle foot pedal to enable opposed reciprocating hand pedals to assist the upward stroke of the foot pedals. According to this aspect of the invention, a sheave is mounted at the forward portion of the bicycle frame. The line from the foot pedals to the hand pedals is continued. The line continues from one hand pedal around the forward sheave rearwardly to the other hand pedal.

An advantage of this aspect of the invention is that motion of both hand pedals can contribute to the upward pedal motion. As a line exerts upward force on an upwardly cycling pedal, one hand moves forwardly while the opposite hand moves rearwardly. A natural and opposing movement of the arms of the rider result.

A further advantage of this invention is that leg and hand motion is synchronized. When one hand pedal is back and towards the rider, the crank on the side of the hand pedal is down clearing the rider's legs from the path of the handle. When the hand pedal is forward and away from the rider, the crank on the side of the hand pedal is up, placing the rider's leg in the path that the handle has just vacated. In short, interference between the hand pedals and legs is not present.

A further advantage of this invention is that the motion imparted to the rider is a natural exercise motion of full body opposition. Considering one side of the body during a typical cranking cycle, it will be observed that as the leg pedals down the arm pulls back. Considering the other side of the body during the same cranking cycle, as the foot pedal is pulled up, the arm pushes forward. There results a symmetry of body opposition which provides for uniformity of effort on arms. legs and torso.

Yet a further advantage of this apparatus is that the disclosed bicycle drive constitutes a minimal departure from conventional cycle drives; conventional bicycle gearing may be used.

Yet another object of this invention is to disclose preferred lever connected hand pedals that are pivotally mounted to the bicycle frame. The levers pivot at their lower end on the frame. At the upper end the provided levers have the hand pedals. The running rigging for lifting the foot pedals is connected to the levers between the pivot and hand pedals.

An advantage of this aspect of the invention is that the levers provide a natural point of attachment for the hand pedals. Additionally, the hand pedals have a arcuate back and forth motion with respect to the frame. The levers enable the smooth application of effort with a frame connected reference for the exertion of the rider.

A further object of this invention is to disclose steering in conjunction with the lever mounted hand pedals. According to this aspect of the invention a Cardan joint is utilized to mount the levers to a conventional bicycle steering wheel. Considering an orthogonal axis system, the joint includes a first degree of freedom parallel to the spin axis of the steering wheel. The joint includes a second degree of freedom normal to both the spin axis of the steering wheel and the steering axis of the steering wheel. The joint does not include a degree of freedom parallel to the steering axis of the steering wheel. Consequently, turning of the hand pedals parallel to the steering axis of the steering wheel turns the steering wheel.

An advantage of this aspect of the invention is that the bicycle can be conventionally steered by turning of the hand pedals much as handle bars are turned. The levers can accommodate a bend that will permit clearance of the turning bicycle front wheel during all possible strokes of the hand pedals.

A further advantage of the disclosed system is that the wheel may be turned while the bicycle is powered.

BRIEF DESCRIPTION OF THE DRAWINGS

Other objects, features and advantages of this invention will become more apparent after referring to the following specification and attached drawings in which:

FIG. 1 is a perspective view of a rider on a bicycle illustrating the major components of the invention disclosed herein;

FIG. 2 is a disclosure of a conventional drive modified with the hand pedal and running rigging arrangement disclosed herein;

FIG. 3 is a picture of a Cardan joint attached to a bicycle at a steering wheel to illustrate pivotal attachment of the hand pedals which enables conventional steering;

FIG. 4 illustrates the handle in a position where the front wheel of the bicycle when turning does not interfere with the handle path;

FIG. 5 illustrates the handles in a position where the front wheel of the bicycle when turning does interfere with the possible path of the handles.

Referring to FIG. 1 a rider R is shown on a bicycle B driven in accordance with this invention. The bicycle includes a conventional gear shift G with a chain ring C having conventional foot pedals, pedal P1 being shown.

The points of novelty of this invention can be clearly seen. Running rigging A extends from pedal P1 to a seat sheave 14 forward to front sheaves 16 rearward to a second seat sheave 18 and then to the remaining pedal P2. Hand pedals H1 and H2 are shown connected via Cardan joints J to enable levers L1 and L2 to steer steering wheel S.

Referring to FIG. 2, the modification of this invention including the connection between the running rigging hand pedals and foot pedals can be understood. First, it will be observed that pedal P1 has a line 20 connected between crank 22 and the foot pedal P1. Line 20 passes around sheave 14 and extends forwardly at line segment 24 to the lever L1. Likewise, pedal P2 has a line segment 30. This line segment is passed between the pedal P2 and the crank 32. Line segment 30 passes over seat sheave 18 and forward at segment 34 to second lever L2.

Stopping here the improvement of the invention to apply an upward force on a rising foot pedal can be understood.

As handle H2 is pushed forwardly, running rigging at line segment 34, sheave 18 and line segment 30 will pull upward on crank 32 at the junction between pedal P2 and the point of attachment of the line.

At the same time, the rider will push down on pedal P1. Thus, for both the descending pedal P1 and the rising pedal P2 there will be applied a force.

It will be understood that handle H1 includes a line segment 26 which passes around sheave 16 to line segment 36 which is attached to handle H2. Without this line, rearward motion of either handle H1 or handle H2 could not apply motive force to either of the pedals P1 or P2. With a continuous running rigging both handles H1 and H2 working in opposed movement will be seen to apply a tension force to the rising crank 22 or 32 to enable effort to be exerted on chain sprocket C.

The reader will observe that the hand and leg movement is inevitably synchronized by the disclosed running rigging. With handle pedal H2 back and towards a rider on seat 40. it will be observed that foot pedal P2 is down. Thus. the knee of a rider on seat 40 will clear the volume into which hand pedal H2 and lever L2 move.

Similarly, with hand pedal H1 and lever L1 in the forward position and away from the rider on seat 40, foot pedal P1 is in the upward position. The knee of the rider will move into a position that hand pedal H1 and lever L1 has recently vacated. Simple study of the disclosed diagram will show that interference between the knees of the rider and the handles is not present.

It will be seen that the motion necessary to ride is a natural motion. Specifically. as a rider seated on seat 40 pushes down on pedal P1, handle H1 must simultaneously be pulled rearwardly. Retracting the handle H1 while extending the pedal P1 is a natural exercise movement of opposition accomplished on one side of the body.

Conversely, as handle H2 is moved forwardly, pedal P2 rises. Again, a natural motion of opposition occurs.

It will be understood that it is possible for the rider to stand while using the disclosed cycle.

Minor subtleties of construction are present. Specifically, forward sheave 16 is mounted on an extension 46 extending forwardly of the frame. This extension 46 is preferably provided with some spring force. The spring force provided enables non-linearity of running rigging length to be accommodated.

These non-linearities can be easily understood. Consider the case where pedal P1 is forward dead center and pedal P2 is rearward dead center. In this case, it will be found that the running rigging disclosed has its maximum length.

Consider now the case where pedal P1 is at top dead center and pedal P2 is a bottom dead center. In this disposition the running rigging will have a shorter length.

By providing spring force at member 46 of the disclosed frame F, it has been found that these nonlinearities are easily accommodated.

It will be understood that FIG. 2 discloses what may be considered an exercise cycle embodiment of this invention. Presuming a load is placed on chain sprocket C, it can be seen that the combination of the foot pedals P1 and P2 together with the hand pedals H1 and H2 will provide to the user exercise. In short, it is not required that this apparatus be coupled to a bicycle as shown in FIG. 1; it may as well find great utility on an exercise cycle.

The reader will realize that the attachment of the hand pedals H1 and H2 to the running rigging can be accommodated in many ways; the specific levers L1 and L2 are preferred.

The invention is provided with levers L1 and L2 as connecting the hand pedals H1 and H2 to the disclosed running rigging. Specifically, the levers L1, L2 are pivoted at pivot 50. The pivot 50 is placed where the front wheel of a two wheel bicycle would be found. The levers each extend from pivot 50 at one end to their respective hand pedals H1, H2 at the opposite end.

It is just as apparent that the running rigging is connected to the levers between the pivot 50 and the respective hand pedals H1, H2. This occurs at points 52 and 53.

It will be seen that levers L1, L2 in movement about pivot 50 impart to the hand pedals H1, H2 a natural and arcuate movement. This natural and arcuate movement enables a smooth frame reference point of exertion for a rider on seat 40.

Having discussed the improvement of the drive mechanism illustrated in FIG. 2, conventional bicycle like steering can be set forth with references to FIGS. 3, 4 and 5.

Referring to FIG. 3, a Cardan joint J is illustrated. Specifically, the reader can see the conventional spin axis 60 of a steering wheel. The turning axis 62 of the steering wheel is illustrated normally intersecting the spin axis 60. These two axes are important in understanding Cardan joint J.

Referring to joint J, it will be remembered that a Cardan joint constitutes an orthogonal array; three axes all intersect one another at 90°. Two of the intersecting axes are free to move. One of the intersecting axes is not free to move. It is this property of the Cardan joint that permits it to be utilized for the steering disclosed herein.

Regarding joint J, it has a first degree of freedom 70 parallel to the spin axis 60 of the steering wheel S.

Joint J has a second axis of freedom 74. This axis of freedom is normal to spin axis 70. Likewise, axis 74 is normal to steering axis 62.

Finally, the Cardan joint J is provided with a rigid axis having no freedom of movement. This axis is axis 72. It is parallel to steering axis 62.

The function can be readily understood. As lever L1 is rotated about axis 72, joint J will not move. Instead, wheel S must itself turn about steering axis 62.

At the same time, the levers L1 and lever L2 (not shown in FIG. 3) will be free to move in all other particulars.

It is now possible to view FIGS. 4 and 5 and to understand the bend placed in levers L together with the bicycle like steering function.

Referring to FIG. 4, handle H1 is connected at lever L1 to joint J.

It is seen that lever L1 is not straight. Lever L1 is instead provided with arcuate band 80. Likewise, handle H2 is connected to lever L2. Lever L2 has a similar and opposite arcuate bend 82.

In the disposition shown in FIG. 4, handle H1 is pulled rearwardly. Handle H2 is forwardly. Wheel S is turning on turning axis 62 to the right. In this disposition there is no interference of wheel S with the paths of the levers L1, L2. The levers could have, in this particular case, been straight.

Turning to FIG. 5, wheel S is shown turning in the opposite direction. The turn is exaggerated for the benefit of understanding.

Specifically, it is seen that bend 80 in lever H1 is necessary to accommodate the protrudance of steering wheel S. This protrudance can be easily understood. Realizing that frame F is essentially in a single plane and that wheel S is in a different and intersecting plane, it can be seen that the wheel must inevitably protrude into a position of interference with the path of handle H1. The bend 80 in handle H1 permits the protrusion of the steering wheel to occur without having interference between the lever L1 and the wheel S.

The case of handle H2, its lever L2 and bend 82 is analogous. The forward portion of the steering wheel S protrudes and intersects the plane of the frame F. Bend 82 in lever L2 permits this protrusion to occur without interference.

It will be appreciated that the attachment of the rigging to the levers at 52, 53 must permit handles H1 and H2 to be rotated. Accordingly, it will be understood that bushings are provided to enable such steering to occur.

It will be understood that this invention may admit of modification. For example the hand pedals here disclosed could be utilized well on the rear seat of a bicycle built for two. The forward seat could include conventionally mounted cyclist. Likewise, other mountings of the improved apparatus of this invention can occur.

It will be understood braking of this device is conventional; traditional cable brakes are utilized with modification well within ordinary skill in the art.

What is claimed is:

1. A cycle for providing simultaneous exercise to the arms and legs of a user straddling said cycle, said cycle comprising in combination:
   a frame;
   a seat on the upper portion of said frame;
   first and second bicycle cranks mounted to said frame below said seat, each crank rotated about an axis transverse of said frame, said cranks including a first crank and pedal for engagement with the left foot of a user on one side of said frame and a second crank and pedal for engagement with the right foot of the user on the other side of said frame, said cranks being in opposed relation relative to their rotation about said axis;
   first and second handles for movement towards and away from the user on said frame for permitting the user to apply power to said handles at least on the away movement; and,
   first and second sheaves below said seat; and
   first continuous running rigging extending between each said handle and over one of said sheaves to each said crank for permitting handle movement away from said user to apply upward force to said cranks.

2. The invention of claim 1 and including a third sheave mounted to said frame forward of said handles; and
   second continuous running rigging running from one of said handles forward to said third sheave and the other of said handles whereby movement of one handle towards said user urges movement of the other handle away from said user to enable both hands to exert an upward force on one of said cranks.

3. The invention of claim 1 and including first and second levers mounted to said frame at said lower end and having said handles attached to said lever arms at said upper end; said levers pivotally mounted to said frame for opposing movement; and means for attaching said running rigging to said levers between said handles and said pivot whereby movement of said handle causes corresponding movement of said running rigging.

4. The cycle of claim 1 and including:
   a rear wheel mounted to said frame and operatively connected to said cranks to permit motive force applied to said cranks to be applied to said wheels;
   a front wheel attached to said frame having a spin axis and rotated about a substantially vertical steering axis to permit said cycle to be steered responsive to rotation of said front wheel; and,
   pivot arms mounted to said front wheel at first and second Cardan joints;
   each of said Cardan joints having first and second degrees of freedom of movement, said first degree of movement being parallel to the spin axis of said steering wheel, said second degree of movement being substantially normal to both the spin axis of said steering wheel and the vertical steering axis of said steering wheel whereby rotation of either or both said hand levers substantially parallel to said steering axis of said steering wheel causes rotation of said front wheel and steering of said cycle.

5. A bicycle including a frame having a front and rear wheel rotatably mounted thereupon for simultaneously providing exercise to the arms and legs of the rider, the bicycle comprising in combination:
   first and second bicycle cranks rotatably mounted on said frame and operatively coupled to the rear wheel, each of said cranks being a distal and proximal end, said proximal end being pivotally attached to said frame, each of said cranks being rotated about an axis normal to the plane of said frame said cranks disposed at opposite sides of said frame and in opposing relation in rotation about said axis;
   first and second pedal members rotatably mounted to the said first and second cranks at the respective distal ends of said first and second cranks;
   a seat attached to said frame and overlying said cranks so as to enable a rider seated on said seat to rotate said cranks by engaging said pedal members with his feet;
   first and second lever members pivotally mounted to the frame, each of said levers having a distal and proximal end, said proximal end being pivotally attached to said frame, each of said cranks being reciprocally pivoted about an axis normal to the plane of said frame, said levers disposed at opposite sides of said frame;
   first and second means for applying a tangential upward force on said first and second cranks each disposed at opposite sides of said frame, each of said means including a cable and a pulley, said pulley being mounted on said frame and overlying said crank, said cable being attached at one end to a respective lever member and at the other end to said pedal member, said cable reeving over said pulley whereby tension in said cable between said lever members and said pedals assists the upward stroke of either of said cranks; and,
   means for reciprocally transferring force between said first and second lever members mounted on the frame and disposed opposite said seat with respect to said lever members, said means includes a pulley and a line, said line attached at one end to said first lever member and at the other end to said second lever member, said line reeved around said pulley being under tension whereby a force applied to either of said lever members will be transferred to said pedals through either of said first and second means for applying a tangential upward force.

* * * * *